(12) United States Patent
Stiesdal

(10) Patent No.: US 8,647,545 B2
(45) Date of Patent: Feb. 11, 2014

(54) METHOD TO MANUFACTURE AT LEAST A COMPONENT OF A BLADE OF A WIND-TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 320 days.

(21) Appl. No.: 12/850,654

(22) Filed: Aug. 5, 2010

(65) Prior Publication Data
US 2011/0037190 A1 Feb. 17, 2011

(30) Foreign Application Priority Data
Aug. 13, 2009 (EP) .................................. 09010464

(51) Int. Cl.
*B29C 45/14* (2006.01)
*B29C 31/04* (2006.01)

(52) U.S. Cl.
USPC .......................... 264/101; 264/152; 264/163

(58) Field of Classification Search
USPC ................. 264/101, 152, 163, 241, 275
See application file for complete search history.

(56) References Cited

U.S. PATENT DOCUMENTS

| 3,791,783 A * | 2/1974 | Damon et al. ................... 19/148 |
| 4,264,278 A * | 4/1981 | Weingart ....................... 416/226 |
| 2009/0035517 A1* | 2/2009 | Bech ............................ 428/138 |

FOREIGN PATENT DOCUMENTS

| EP | 0392974 A2 | 10/1990 |
| WO | WO 90/07428 A1 | 7/1990 |
| WO | WO 2007/039085 A1 | 4/2007 |
| WO | WO 2009/077582 A1 | 6/2009 |

OTHER PUBLICATIONS

Beckwith (Filament Winding vs. Fiber Placement Manufacturing Technologies, SAMPE Journal, vol. 44 No. 2 Mar./Apr. 2008).*

* cited by examiner

*Primary Examiner* — Yogendra Gupta
*Assistant Examiner* — Robert J Grun

(57) ABSTRACT

A method, machine and blade of a wind-turbine are disclosed. At least a component of a blade includes at least one layer of a composite structure. The layer is built up by a number of unconnected single roving-bundles, which are aligned unidirectional and which shows a common direction. The roving-bundles are laid down automatically into a forming tool.

17 Claims, 2 Drawing Sheets

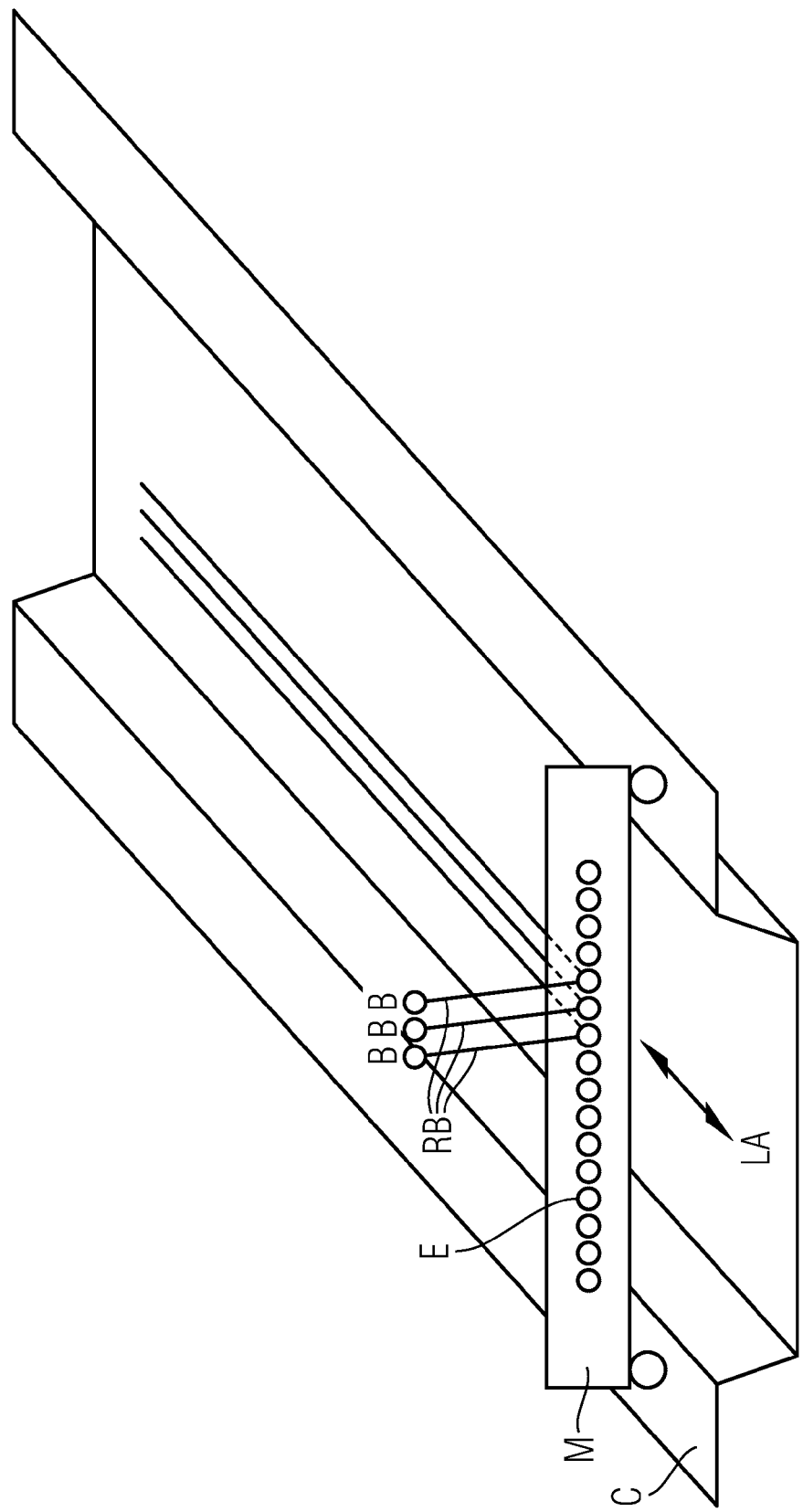

Ply-Drop-Configurations staircased-grouped overlapped-grouped staircased-dispersed overlapped-dispersed

METHOD TO MANUFACTURE AT LEAST A COMPONENT OF A BLADE OF A WIND-TURBINE

CROSS REFERENCE TO RELATED APPLICATIONS

This application claims priority of European Patent Office application No. 09010464.7 EP filed Aug. 13, 2009, which is incorporated by reference herein in its entirety.

FIELD OF INVENTION

The invention relates to a method to manufacture a wind-turbine blade or at least a component for a wind-turbine blade.

BACKGROUND OF INVENTION

Composite structures are widely used to build up whole blades or even components for a blade of a wind-turbine. For this a matrix of fiber glass mats is used. The building-up of the matrix is characterized by a considerably amount of manual layup work, where fiber mats with fibers of different orientation are put on top of each other in order to build up the strength and stiffness of the blade. The manual layup work is difficult and time-expensive.

Fiber mats are standard components and can be handled easily in a manual layup work. Fiber mats or sheets of fibers are made of woven and non woven fabric. The nonwoven fabrics are made of unidirectional fibers held together by a chemical binder or the like. The woven fabrics are made on looms where fibers pass over and under each other in a bidirectional manner in order to bind the fibers together.

A beam of a blade of a wind-turbine comprises a number of layers of fabrics having unidirectional fibers. The fibers are aligned in a longitudinal direction of the blade in order to give the correct strength and stiffness in a flapwise direction of the blade.

A so called "multi-axial mat" (such as a biaxial mat) is placed on top to ensure a torsion-flexibility and strength to the blade structure. The number of layers and directions of the fibers can be changed to achieve different mechanical properties at different positions of the blade.

The structural characteristics of a fiber reinforced laminate are usually governed by the amount, type and orientation of the reinforcement fibers. Typically, the stiffness and strength of fibers can only be taken into account to the extent that loading occurs in the longitudinal fiber direction.

Therefore, a traditionally designed laminate assumes that the fibers of the finished laminate will be oriented in the same direction as the direction of the fibers when placed in a forming tool such as a mould for a wind-turbine blade.

However, in many cases wrinkles in the fiber layers occur as a result of the manufacturing process and the characteristics of the fiber mats and fabrics used. Wrinkles are likely to develop in the manual layup work due to the woven characteristics or the interconnection of the fibers in the non woven fabrics. Highly skilled and experienced layup workers are needed to ensure that wrinkles are not introduced into the blade-structure during the difficult layup work.

However, despite the experience of the layup workers wrinkles may occur. When wrinkles occur the fibers no longer have the desired orientation and severe overload of the laminate may be the result.

Repair or rejection of the laminate will usually be required if wrinkles do occur, as the loss of stiffness and/or strength in wrinkles will often exceed any realistic safety margins of the structure. The repair work is done by hand and is therefore tedious and costly. Rejection of the entire structure is even more costly and needs to be avoided.

The thickness of the laminate needs to vary in order to obtain the correct structural characteristics and the desired aerodynamically shape of the blade structure. The stiffness of the wind-turbine blade of course depends on the shell thickness, the cross-sectional geometry and the material.

The cross-sectional dimensions of the wind-turbine blade and the thickness vary in the longitudinal direction of the blade. The variation in the thickness is controlled by reducing or increasing the number of plies of laminates in the structure.

So called "ply drops" are formed in areas, where the thickness changes. At these positions one or more layers are terminated, so discontinuities are introduced in the material and in the geometry of the structure. Discontinuities induce stress concentrations at the ply drop areas. In many cases these areas are decisive for the life time and the strength of the whole structure.

The geometrical discontinuity of the ply drop zone leads to an accumulation of resin in so called pockets during a curing process. The resin-rich pockets could lead to a development of cracks in the structure.

A lot of research work needs to be spent to achieve an optimum design in regard to the ply drop zones. However, it is very difficult to implement optimized ply drop zones if a manual layup work is used.

The fiber mats used are typically large and heavy and difficult to handle when they are positioned in a forming tool; a precise layup and alignment of the fiber mats is very difficulty.

SUMMARY OF INVENTION

It is therefore the aim of the invention to provide an improved method to produce a wind-turbine blade or a component of a wind-turbine-blade, to reduce or even avoid the formation of wrinkles during the manufacturing and to reduce the needed time for the production.

This aim is solved by the features of the independent claims. Improved embodiments of the invention are subject of the dependent claims.

According to the invention at least a component of a blade of a wind-turbine is manufactured, while the component comprises at least one layer of a composite structure. The layer is built up by a number of unconnected single roving-bundles, which are aligned unidirectional showing a common direction. The roving-bundles are laid down automatically into a forming tool.

Due to the use of unconnected single roving-bundles there is no woven characteristic and no interconnection between the fibers—so the formation of wrinkles during the manufacturing is avoided by the new method.

It is also possible to use cheap roving bundles instead of expensive pre-fabrics.

By the use of a forming tool it is possible to build up a needed structure of the component faster and with an improved quality.

Roving is the simplest form of class and is used to create secondary fiber forms for composite manufacturing such as fiber mats etc.—but now it is possible to handle and use roving bundles directly to build up a wind-turbine blade.

The inventive method can be combined with a traditional layup work in such a way that the most difficult and critical layers are laid out automatically and the more trouble-free layers are laid out manually by layup workers.

The inventive method also reduces the amount of hard layup work where large and heavy mats are laid up and positioned to a forming tool. This way, the invention improves the working conditions for the layup workers.

The forming tool can be a mould or in its simplest form a lay-up table or a bench.

In a preferred embodiment each single roving bundle is cut individually and automatically at a predetermined length. By controlling the lengths of the roving bundles it becomes possible to design and build up the layers of fibers in more precise and advanced manner.

By using an automated layup process a more sophisticated blade structure with more precise structural characteristics can be designed and achieved.

Furthermore, a stronger and more consistent blade structure is achieved compared to the structures achieved by manual layup work, which shows a poor precision and which varies in the layup-quality.

Optimum ply drop zones can be achieved, where the termination of each roving bundle is precisely balanced to the termination of the other layers of the structure.

This way, it is possible to implement different ply-drop configurations in a more controlled manner. Configurations such as staircase and overlapped configurations, known by persons skilled in the art, can now be achieved and reproduced in each new blade. It is also possible to reduce the size of ply drop zones.

In a further embodiment the roving bundles are laid-out into a forming tool, where the forming tool is arranged as a mould for a part for a wind-turbine blade. At least one layer of fibers is laid out in a longitudinal direction of the mould part. The mould can be either a mould part for the suction side or for the pressure side of a wind-turbine blade.

This way, the majority of the fibers in the blade structure can be laid up using an automated production process. Wrinkles in an important load carrying part of the blade structure are hereby avoided and time expensive and complicated repair work is eliminated.

In a further embodiment a forming tool is arranged for building up a part of a wind-turbine blade, where a carrier is positioned at the bottom of the forming tool.

At least one layer of unconnected unidirectional roving-bundles of a fiber-material are laid-out on top of the carrier, and the roving-bundles are laid out in longitudinal, axial or another predetermined direction.

Each roving-bundle is cut individually to achieve a predetermined shape of the layer. This way, it is now possible to produce and layup a number of layers in a forming tool.

So it is possible the ending of each roving-bundle is cut in a way that the resulting ending of the stacked roving-bundles result in a conical shape. This allows to achieve a smooth intersection from the stacked roving-bundles to another blade-components, which are adjacent to the stacked roving-bundles.

In another preferred embodiment the roving-bundles will be cut individually but in a randomized manner. This results in an ending of the roving-bundles, which show an irregular shape. This allows an irregular and therefore very reliable intersection to another adjacent blade-component. The transition between the two parts of blade components is thus diffuse such that a smooth transition of the parts is obtained.

A carrier, made preferably of paper, is used to carry the roving-bundles. The carrier may be located into or may be a part of the forming-tool.

The carrier allows to transport and to move stacked roving-bundles and the carrier out from the forming-tool and into a mould, for example. The mould is used to build-up the structure of the blade in a sandwich-assembly.

As resin (which is used during a "vacuum assisted resin transfer, VART"-process to finish the blade) will interfuse the paper completely, there is no need to remove the carrier.

So the paper-carrier stays inside the blade without disadvantage.

It is also possible to use a preformed fixture as forming tool. This preformed fixture might be located nearby the mould.

The fixture may be shaped as a replica of the surface, which is addressed to receive a layer of roving-bundles as stated above.

It is also possible to use a pre-formed component of the blade as forming-tool. In this case the pre-formed part and the stacked roving-bundles are brought together into the mould of the blade.

It is also possible to use a membrane instead of paper to transport the roving-bundles. If the carrier is destined to remain inside the blade, the membrane is designed to allow the infusion of the resin during the VART-process.

In a preferred embodiment vacuum is used to transport the stacked roving-bundles and their carrier inside the mould.

The vacuum is applied by a machine through the stacked roving-bundles, acing on the paper or the membrane used as carrier.

So the carrier will be sucked towards the machine together with the roving-bundles to allow a very easy transportation of the whole component. This way, it is possible to lift and handle a component build up of layers of single unconnected roving bundles.

The roving-bundles are supplied on so called "bobbins" in a preferred embodiment. These bobbins are located in a stationary fixture or they may be attached to a machine, which is moved forward and backward along a longitudinal axis to build up the stacked roving-bundles in layers.

The machine comprises for example a number of cutting devices, used to cut each roving-bundle individually as described above. The cutting will be done in a predetermined manner to achieve the specific endings of the stacked roving-bundles as described above.

In a first embodiment a dedicated cutting-device is allocated to each single roving-bundle or the cutting-device is allocated to a number of roving-bundles.

For example each roving-bundle is running through an eye of the machine, while the cutting device is located nearby the eye.

In a second embodiment the used cutting device is located movable within the machine. This allows to use only one cutting device for different roving bundles, cutting them at different positions of the machine.

The invention also allows to avoid wrinkles as non-connected roving-bundles are laid-up in a longitudinal-direction, forming layers of the blade or the component.

The invention allows to improve the quality of the production of the component and of the blade, as the simple lay-up of the roving-bundles into the carrier and the transportation of the carrier with its roving-bundles to the blade-mould can be performed very easy and quick in time.

The layup machine is in a preferred embodiment controlled by computer. This way it is possible to control the layup and the tel a roving bundle in order to obtain a sophisticated structure.

The layup machine is in a preferred embodiment a multi-axis machine, comprising a carriage that is able to shuttle back and forth across the forming tool. At least one layer of roving bundles is fed into the forming tool in a predetermined direction between 0 and 180 deg. This way, the machine can be used to build up a number of different layers of unidirectional roving bundles but with different directions with respect to the blade. It is hereby possible to automate the whole layup process of the fibers both in a longitudinal, axial and cross diagonal direction.

The invention is not limited to the use of rovings of glass fiber it could be substituted with carbon fiber as well.

BRIEF DESCRIPTION OF THE DRAWINGS

The invention is described in more detail by help of a drawing.

FIG. 1 shows the inventive method,

DETAILED DESCRIPTION OF INVENTION

FIG. 1 shows the inventive method. A machine M is used to lay-up a number of single roving-bundles RB of a fiber-material onto a carrier C.

The carrier C is used and designed as a forming tool to give the stacked roving-bundles a pre-defined shape.

The dry roving-bundles RB are supplied by so called bobbins B. Each roving bundle RB is fed by the bobbin B to an allocated eye E.

The machine M is moving forward and backward along a longitudinal axis LA of the carrier C. So different layer of roving-bundles RB can be brought inside the carrier C, a layer by each movement of the machine M.

Figure 2A:
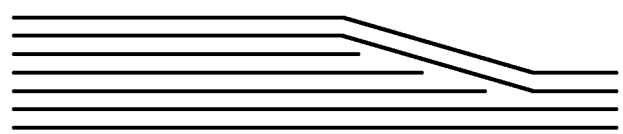
FIG. 2 shows different possibilities to design the endings of stacked layers of roving-bundles.
Figure 2B:
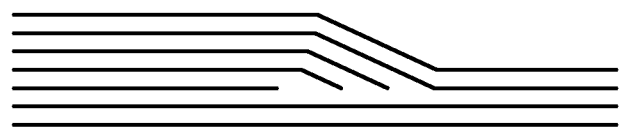
Figure 2C:
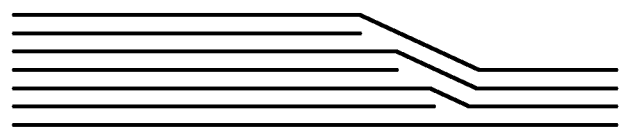
Figure 2D:
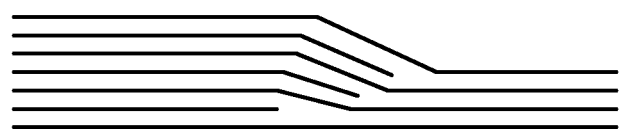

FIG. 2 shows different possibilities to design the endings of stacked layers of roving-bundles.

The roving-bundles will be cut individually to form these endings.

It is also possible to cut the roving-bundles in a randomized manner in reference to a dedicated ending—not shown here.

It is also possible to cut the roving-bundles in a way, that an ending shows a conical shape—not shown here.

The invention claimed is:

1. A method to manufacture at least a component of a blade of a wind-turbine, comprising:
   providing at least one layer of a composite structure; and
   building up the at least one layer by automatically laying down a plurality of dry and unconnected single roving-bundles,
   wherein the plurality of roving-bundles are laid down onto a carrier, which is positioned inside a forming tool or part of the forming tool, such that the plurality of roving-bundles are aligned unidirectionally inside the forming tool, the forming tool is arranged and shaped for building up a part of the blade, and
   wherein the plurality of roving-bundles which are laid onto carrier are cut individually in a randomized manner to form an irregular intersection for a joining of a further blade component.

2. The method according to claim 1, wherein the forming tool is a mould used for a vacuum assisted resin transfer-method.

3. The method according to claim 1, wherein the forming tool is pre-impregnated or partially impregnated.

4. The method according to claim 1, wherein at least one roving-bundle is laid down in a longitudinal direction of the forming tool.

5. The method according to claim 1, wherein the carrier is used to transport the plurality of roving-bundles into a mould.

6. The method according to claim 5, wherein paper or a membrane is used as carrier, wherein the paper or membrane allows an infusion of resin.

7. The method according to claim 5, wherein the forming tool is positioned nearby the mould, and the carrier and the plurality of roving-bundles are lifted and positioned into the mould by help of a vacuum.

8. The method according to claim 7, wherein the vacuum is applied by a machine through stacked layers of the plurality of roving bundles and onto the carrier, so the carrier is sucked towards the machine together with the roving-bundles.

9. The method according to claim 1, further comprising individually cutting each of the plurality of roving-bundles to a predetermined length, when the respective roving-bundle is laid into the forming tool.

10. The method according to claim 1, wherein a layup machine is used to lay-up and cut the roving-bundles on the forming tool, and the layup machine is moved forward and backward along a longitudinal axis of the forming-tool to build up the at least one layer by stacking a at least a portion of the plurality of roving-bundles.

11. The method according to claim 10, wherein the plurality of roving-bundles is supplied by bobbins, which are located in a stationary fixture or which are attached to the machine.

12. The method according to claim 10, wherein the machine uses cutting devices to individually cut each of the plurality of roving-bundle in a predetermined manner to achieve a specific length of the respective roving-bundle.

13. The method according to claim 10, wherein a cutting-device is allocated to each single roving-bundle.

14. The method according to claim 10, wherein a cutting-device is allocated to a number of the plurality of roving-bundles.

15. A method according to claim 12, wherein a cutting device is located movable within the machine to be used as single cutting device for different roving bundles.

16. The method according to claim 10, wherein the layup machine is a multi-axis machine comprising a carriage being designed to shuttle back and forth across the forming tool, and at least one layer of the plurality of roving bundles is fed into the forming tool in a predetermined direction between 0 and 180 degree.

17. A method according to claim 1, wherein the manufactured component is a blade of a wind turbine.

* * * * *